(12) United States Patent
Bond et al.

(10) Patent No.: US 11,738,685 B1
(45) Date of Patent: Aug. 29, 2023

(54) OLFACTORY COMMUNICATION SYSTEM FOR GENERATING AROMA-BASED NOTIFICATIONS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/809,045

(22) Filed: Jun. 27, 2022

(51) Int. Cl.
*B60Q 9/00* (2006.01)
*B60H 3/00* (2006.01)

(52) U.S. Cl.
CPC ............. *B60Q 9/00* (2013.01); *B60H 3/0007* (2013.01)

(58) Field of Classification Search
CPC ................................. B60Q 9/00; B60H 3/0007
See application file for complete search history.

(56) References Cited

U.S. PATENT DOCUMENTS

| | | | | |
|---|---|---|---|---|
| 2007/0100986 | A1* | 5/2007 | Bagley | G06Q 10/10 709/224 |
| 2010/0117828 | A1* | 5/2010 | Goldman | G08B 7/06 340/540 |
| 2010/0162117 | A1* | 6/2010 | Basso | H04S 7/301 715/716 |
| 2013/0234823 | A1* | 9/2013 | Kahn | A61B 5/369 340/3.1 |
| 2014/0196111 | A1 | 7/2014 | Kesavan et al. | |
| 2016/0275457 | A1* | 9/2016 | Dhillon | G06Q 10/1095 |

FOREIGN PATENT DOCUMENTS

| | | |
|---|---|---|
| DE | 10115522 A1 | 10/2002 |
| DE | 102019131947 A1 | 5/2021 |
| JP | 2020086625 A | 6/2020 |

OTHER PUBLICATIONS

German Patent and Trade Mark Office. First Office Action for DE Application No. 102022127217.6 dated Apr. 25, 2023, pp. 1-8.

* cited by examiner

*Primary Examiner* — Omer S Khan
(74) *Attorney, Agent, or Firm* — Vivacqua Crane, PLLC

(57) ABSTRACT

An olfactory communication system for generating aroma-based notifications to one or more occupants of a vehicle includes an aroma diffuser that emits aromas into an interior cabin of the vehicle and a controller in electronic communication with the aroma diffuser. The one or more controllers execute instructions to receive a message indicating a specific event is occurring, where the specific event is an occurrence that the one or more occupants experience while in the interior cabin of the vehicle. In response to receiving the message, the one or more controllers determine a customized aroma based on the specific event, where the customized aroma creates an odor that informs the one or more occupants of the specific event. The one or more controllers instruct the aroma diffuser to emit the customized aroma into the interior cabin of the vehicle.

20 Claims, 2 Drawing Sheets

OLFACTORY COMMUNICATION SYSTEM
FOR GENERATING AROMA-BASED
NOTIFICATIONS

INTRODUCTION

The present disclosure relates to an olfactory communication system for generating aroma-based notifications to one or more occupants of a vehicle.

Many vehicles include a variety of systems that provide alerts or other types of notifications to the driver and other occupants of the vehicle. The notification may be an audio alert or a visual alert. For example, a vehicle may include a speaker that generates sound to inform the vehicle occupants of various events. In particular, the speaker may emit an alarm, chimes, or a human voice to inform the occupants of an event. However, some occupants may find certain types of audio alerts such as, for example, buzzing or other repetitive sounds annoying. Furthermore, audio alerts may also be ineffective for occupants who are hard of hearing and may not be able to hear the sounds generated by the speaker. Similarly, the vehicle may be equipped with lights or screens to generate visual indicators to inform the passengers of various events. For example, text or images may be shown upon a screen to alert the vehicle occupants of any number of events. However, if an occupant is visually-impaired, then it may be difficult or impossible for he or she to see the text and graphics that are displayed upon the screen.

Thus, while current vehicles achieve their intended purpose, there is a need in the art for an improved approach for providing notifications to visually-impaired and individuals who are hard of hearing.

SUMMARY

According to several aspects, an olfactory communication system for generating aroma-based notifications to one or more occupants of a vehicle is disclosed. The olfactory communication system includes an aroma diffuser that emits aromas into an interior cabin of the vehicle and one or more controllers in electronic communication with the aroma diffuser. The one or more controllers executing instructions to receive a message indicating a specific event is occurring, wherein the specific event is an occurrence that the one or more occupants experience while in the interior cabin of the vehicle. In response to receiving the message, the one or more controllers determine a customized aroma based on the specific event, where the customized aroma creates an odor that informs the one or more occupants of the specific event. The one or more controllers instruct the aroma diffuser to emit the customized aroma into the interior cabin of the vehicle.

In an aspect, the specific event is driving through a specific geographic region, and the customized aroma is symbolic of the specific geographical region.

In another aspect, the specific geographical region is one of the following: a city, state, and neighborhood.

In yet another aspect, the specific geographical region is an environmental region.

In an aspect, the environmental region is one of the following: a body of water, a forest, a jungle, a beach, a desert, or a farm.

In another aspect, the specific event is a maintenance procedure that is required for the vehicle.

In yet another aspect, the maintenance procedure indicates one or more of the following: low fluid levels, routine maintenance, and replacement of one or more components.

In an aspect, one or more controllers are in wireless communication with a personal electronic device associated with a respective occupant of the vehicle.

In another aspect, the personal electronic device includes one or more processors and memory that have access to a personal calendar associated with the respective occupant.

In yet another aspect, the one or more controllers executes instructions to determine an upcoming appointment for the respective occupant based on the personal calendar, where the upcoming appointment is the specific event.

In an aspect, the upcoming appointment is one of the following: a lunch appointment, an appointment with a medical professional, visiting a home of a friend or relative, a vacation, and an anniversary.

In another aspect, the specific event represents weather conditions that surround the vehicle.

In yet another aspect, the one or more controllers are in electronic communication with one or more outside computing devices that are part of a drive-thru restaurant, and the specific event is experiencing one or more menu items that the drive-thru restaurant serves.

In an aspect, the aroma diffuser includes a plurality of aromatic compounds that are stored separately from one another and mixed together according to a formula to create the customized aroma that is released into the interior cabin of the vehicle.

In another aspect, the one or more controllers store information regarding personal preferences of the one or more occupants, and the personal preferences indicate certain aromas that the one or more occupants do not tolerate.

In yet another aspect, a method for generating aroma-based notifications to one or more occupants of a vehicle by an olfactory communication system is disclosed. The method includes receiving, by a controller, a message indicating a specific event is occurring, where the specific event is an occurrence that the one or more occupants experience while in an interior cabin of the vehicle. In response to receiving the message, the method includes determining a customized aroma based on the specific event, where the customized aroma creates an odor that informs the one or more occupants of the specific event. Finally, the method includes instructing an aroma diffuser to emit the customized aroma into the interior cabin of the vehicle.

In another aspect, a vehicle is disclosed, including an olfactory communication system for generating aroma-based notifications to one or more occupants of a vehicle. The olfactory communication system includes an aroma diffuser that emits aromas into an interior cabin of the vehicle and one or more controllers in electronic communication with the aroma diffuser. The one or more controllers executing instructions to receive a message indicating a specific event is occurring, where the specific event is an occurrence that the one or more occupants experience while in the interior cabin of the vehicle. In response to receiving the message, the one or more controllers determine a customized aroma based on the specific event, where the customized aroma creates an odor that informs the one or more occupants of the specific event. The one or more controllers instruct the aroma diffuser to emit the customized aroma into the interior cabin of the vehicle.

In yet another aspect, the specific event is driving through a specific geographic region, and the customized aroma is symbolic of the specific geographical region.

In an aspect, the specific event is a maintenance procedure that is required for the vehicle.

In another aspect, the specific event represents weather conditions that surround the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
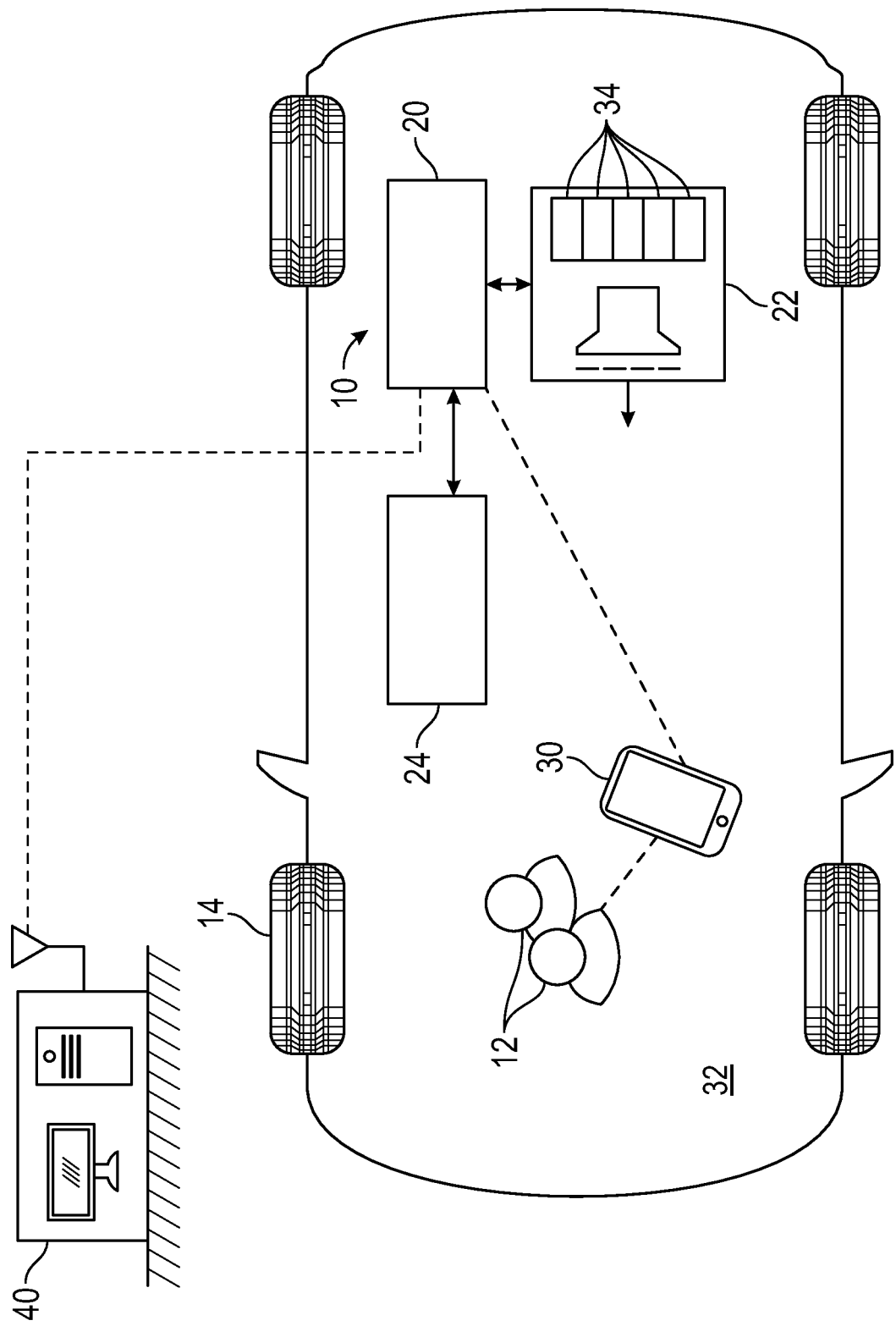
FIG. 1 is a schematic diagram of a vehicle including the disclosed olfactory communication system for generating aroma-based notifications to one or more occupants of the vehicle, according to an exemplary embodiment.

Referring to FIG. 1, an olfactory communication system 10 for generating aroma-based notifications to occupants 12 of a vehicle 14 is illustrated. The vehicle 14 may be any type of vehicle such as, but not limited to, a sedan, truck, sport utility vehicle, van, or motor home. The olfactory communication system 10 includes one or more controllers 20 in electronic communication with an aroma diffuser 22 and one or more vehicle systems 24. In an embodiment, the one or more controllers 20 are also in wireless communication with one or more personal electronic devices 30 associated with one of the occupants 12 of the vehicle 14. The aroma diffuser 22 is configured to emit aromas into an interior cabin 32 of the vehicle 14. Specifically, the aroma diffuser 22 includes a plurality of aromatic compounds 34 that are stored separately from one another that are mixed together according to a formula to create customized aroma that is released into the interior cabin 32 of the vehicle 14. The one or more vehicle systems 24 include, for example, a global positioning system (GPS), a voice recognition system, a vehicle-to-everything (V2X) system, a vehicle health management system, and a virtual assistant program.

As explained below, the disclosed olfactory communication system 10 releases customized aromas into the interior cabin 32 of the vehicle 14. Each customized aroma informs the occupants 12 of the vehicle 14 of a specific event. That is, each customized aroma is formulated to create an odor that informs the occupants 12 of the vehicle 14 of the specific event. The customized aroma is a virtual odor that invokes either a memory or thought of the specific event in the mind of the occupants 12 of the vehicle 14. For example, when the vehicle 14 is driving towards a particular restaurant, then the aroma diffuser 22 releases aromatic compounds 34 that invoke the thought of the type or kind food that is served by the particular restaurant. More specifically, for example, if the restaurant is a pizzeria, then the aroma diffuser 22 releases aromatic compounds 34 representative of pizza into the interior cabin 32 of the vehicle 14.

The aroma diffuser 22 is any type of device for releasing the aromatic compounds 34 into the interior cabin 32 of the vehicle 14. In an embodiment, the aroma diffuser 22 may be located within an air handling unit that circulates air as part of a vehicle heating, ventilating, and air conditioning (HVAC) system. In another embodiment, the aroma diffuser 22 is located within the interior cabin 32 of the vehicle 14. The aroma diffuser 22 receives instructions from the one or more controllers 20 indicating the customized aroma that is to be released into the interior cabin 32 of the vehicle 14. In response to receiving the instructions indicating the customized aroma, the aroma diffuser 22 mixes one or more of the aromatic compounds 34 together to create the customized aroma. In particular, the instructions indicating the customized aroma include a formula indicating the specific aromatic compounds 34 and an amount of each aromatic compound 34 that is required to create the customized aroma. In an embodiment, after releasing the aromatic compounds 34 into the interior cabin 32, the one or more controllers 20 may instruct a blower fan of the vehicle HVAC system to push either heated or cooled air through the interior cabin 32 of the vehicle 14 to dissipate and clear away the customized odor.

The specific event is an occurrence that one or more of the occupants 12 experience while in the interior cabin 32 of the vehicle 14. In one embodiment, the specific event is driving through a specific geographic region, where the customized aroma is symbolic of the specific geographical region. In one embodiment, the specific geographical region is a city, state, or neighborhood. For example, as mentioned above, the customized scent would be peaches for the state of Georgia or oranges for the state of Florida. In another embodiment, the specific geographical region is an environmental region such as, but not limited to, a body of water, a forest, a jungle, a beach, a desert, or a farm. The customized aroma would be, for example, the smell of an ocean or lake for a body of water or the smell of trees for a forest. The customized aroma informs the occupants 12 of the vehicle 14 of the specific event, which is driving through the specific geographical region. The olfactory communication system 10 may be especially beneficial for vision-impaired occupants who may not be able to clearly see out the window of the vehicle 14, and therefore do not know where they are located.

In another embodiment, the specific event is driving the vehicle 14 to a physical destination. The physical destination represents any physical location that the vehicle 14 may navigate to. In one embodiment, the physical destination is a commercial establishment such as, for example, a supermarket, shopping mall, a gas station, a dealership, a movie theatre, or a restaurant. For example, if the commercial establishment is a movie theatre, then the customized aroma would be the smell of popcorn. In another embodiment, the physical destination is a place of worship or an event venue. Some examples of event venues include stadiums, concert halls, and arenas.

In one embodiment, the one or more controllers 20 are in wireless communication with one or more outside computing devices 40 that are part of the physical destination. In this example, the physical destination is a drive-thru restaurant and the specific event is experiencing one or more menu items that the drive-thru restaurant serves. Specifically, the drive-thru restaurant sends a message to the one or more controllers 20 indicating the specific event is a particular menu item that the drive-thru restaurant wants customers to experience. For example, the drive-thru restaurant may want customers to experience the aroma of one or more menu items when a customer (i.e., the occupant 12) is unable to decide what he or she wants to order based on the menu descriptions or images. In one example, if a customer is unsure if they would like to order to a particular type of spicy hamburger that includes ingredients such as fried jalapenos, salsa, and Pepper Jack cheese, then the drive-thru restaurant may send a message to the one or more controllers 20 indicating the specific event is experiencing the particular type of spicy hamburger, and the customized aroma is the smell of the particular type of spicy hamburger.

In yet another embodiment, the specific event is a maintenance procedure that is required for the vehicle 14. Some examples of maintenance procedures that the vehicle 14 may undergo include, but are not limited to, low fluid levels, routine maintenance such as an oil change, or replacement of one or more components. For example, if the specific event is a maintenance notification indicating low windshield washer fluid, then the customized aroma would be the smell of glass cleaner. In still another example, if the maintenance procedure is an oil change, then the customized aroma would be the smell of motor oil.

In still another embodiment, the one or more controllers 20 are in wireless communication with the personal electronic device 30 associated with one of the occupants 12 of the vehicle 14. Some examples of the personal electronic device 30 include, but are not limited to, a smartphone or a tablet computer. The personal electronic device 30 includes one or more processors and memory that have access to a personal calendar associated with the respective occupant 12. The one or more controllers 20 determine upcoming appointments for the respective occupant 12 based on the personal calendar. In the present embodiment, the specific event is an upcoming appointment for the respective occupant 12. Some examples of upcoming appointments include, but are not limited to, lunch appointments, appointments with medical professionals, visiting a home of a friend or relative, a vacation, or an anniversary. For example, if the upcoming appointment is visiting the home of the occupant's grandmother (which smells like peppermint candy), then the customized aroma would be the smell of peppermint candy. In another example, if the upcoming appointment is a doctor appointment, then the customized aroma is the odor of a doctor's office.

In still another embodiment, the specific event is a news event that at least one of the occupants 12 are following. The news event may be, for example, a stock market quote, a score for a sports team that the occupant is following, or various traffic conditions. For example, if the occupant 12 owns stock in a particular corporation, and if the stock price increased or a dividend is about to be paid, then the customized aroma would be the smell of paper money.

In still another embodiment, the specific event is weather conditions that surround the vehicle 14. For example, if the vehicle 14 is about to drive through rain or snow, then the customized aroma would mimic the smell of precipitation.

In one embodiment, the one or more controllers 20 store information regarding personal preferences of one or more of the occupants 12, where the personal preferences indicate certain aromas that the occupants do not tolerate. For example, if one of the occupants 12 is allergic to or has a particular dislike for a particular odor, then the one or more controllers 20 do not instruct the aroma diffuser 22 to release the customized aroma that into the interior cabin 32 of the vehicle 14. For example, if one of the occupants 12 are allergic to or do not tolerate the smell of popcorn, then the one or more controllers 20 do not instruct the aroma diffuser 22 to emit the customized aroma of popcorn when driving by a movie theatre.

Figure 2:
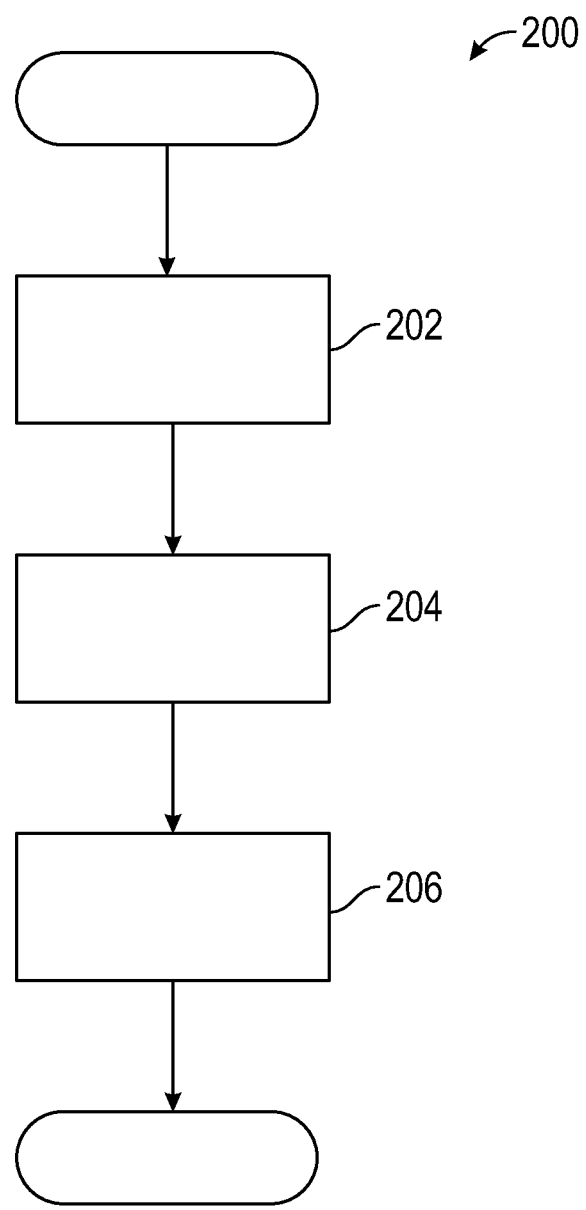
FIG. 2 is a process flow diagram illustrating a method for generating aroma-based notifications to one or more occupants of the vehicle using the olfactory communication system, according to an exemplary embodiment.

FIG. 2 is an exemplary process flow diagram illustrating a method 200 for generating aroma-based notifications to one or more occupants 12 of the vehicle 14 using the olfactory communication system 10. Referring to both FIGS. 1 and 2, the method 200 begins at block 202. In block 202, the one or more controllers 20 receive a message from the one or more vehicle systems 24 indicating the specific event is occurring. The message is generated by the one of the vehicle systems 24. For example, a GPS would indicate that the specific event is driving through a specific geographic region. In the present example, the customized aroma is symbolic of the specific geographical region (e.g., the state of Georgia for peaches). The method 200 may then proceed to block 204.

In block 204, in response to receiving the message, the one or more controllers 20 determine the customized aroma based on the specific event, wherein the customized aroma creates an odor that informs the one or more occupants 12 of the specific event. In the present example, the customized odor would be peaches to inform the occupants 12 that they are entering the state of Georgia. The method 200 may then proceed to block 206.

In block 206, the one or more controllers 20 instruct the aroma diffuser 22 to emit the customized aroma into the interior cabin 32 of the vehicle 14. The customized aroma may then fill the interior cabin 32 of the vehicle 14, and the occupants 12 are informed of their location, which is the state of Georgia, by the customized aroma of peaches. The method 200 may then terminate.

Referring generally to the figures, the disclosed olfactory communication system provides various technical effects and benefits. Specifically, the olfactory communication system provides an approach for notifying the occupant of a vehicle of a specific event based on a customized odor. The customized odor invokes either a memory or thought of the specific event in the mind of the occupants of the vehicle, without the need to communicate based on hearing or sight. Therefore, the olfactory communication system may be especially effective for communicating information to either individuals who are hard of hearing or visually-impaired occupants of a vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An olfactory communication system for generating aroma-based notifications to one or more occupants of a vehicle, the olfactory communication system comprising:

an aroma diffuser that emits aromas into an interior cabin of the vehicle; and one or more controllers are in electronic communication with the aroma diffuser, the one or more controllers are in wireless communication with a personal electronic device associated with one of the one or more occupants of the vehicle, wherein the personal electronic device includes one or more processors and memory that have access to a personal calendar associated with the one of the one or more occupants;

the one or more controllers executing instructions to:
receive a message indicating a specific event is occurring, wherein the specific event is an occurrence that the one or more occupants experience while in the interior cabin of the vehicle;
in response to receiving the message, determine an upcoming appointment for the one of the one or more occupants based on the personal calendar, wherein the upcoming appointment is the specific event, determine a customized aroma based on the specific event, wherein the customized aroma creates an odor that informs the one or more occupants of the specific event; and
instruct the aroma diffuser to emit the customized aroma into the interior cabin of the vehicle.

2. The olfactory communication system of claim 1, wherein the specific event is driving through a specific geographic region, and wherein the customized aroma is symbolic of the specific geographical region.

3. The olfactory communication system of claim 2, wherein the specific geographical region is one of the following: a city, state, and neighborhood.

4. The olfactory communication system of claim 2, wherein the specific geographical region is an environmental region.

5. The olfactory communication system of claim 4, wherein the environmental region is one of the following: a body of water, a forest, a jungle, a beach, a desert, or a farm.

6. The olfactory communication system of claim 1, wherein the specific event is a maintenance procedure that is required for the vehicle.

7. The olfactory communication system of claim 6, wherein the maintenance procedure indicates one or more of the following: low fluid levels, routine maintenance, and replacement of one or more components.

8. The olfactory communication system of claim 1, wherein the upcoming appointment is one of the following: a lunch appointment, an appointment with a medical professional, visiting a home of a friend or relative, a vacation, and an anniversary.

9. The olfactory communication system of claim 1, wherein the specific event represents weather conditions that surround the vehicle.

10. The olfactory communication system of claim 1, wherein the one or more controllers are in electronic communication with one or more outside computing devices that are part of a drive-thru restaurant, and the specific event is experiencing one or more menu items that the drive-thru restaurant serves.

11. The olfactory communication system of claim 1, wherein the aroma diffuser includes a plurality of aromatic compounds that are stored separately from one another and mixed together according to a formula to create the customized aroma that is released into the interior cabin of the vehicle.

12. The olfactory communication system of claim 1, wherein the one or more controllers store information regarding personal preferences of the one or more occupants, and wherein the personal preferences indicate certain aromas that the one or more occupants do not tolerate.

13. The olfactory communication system of claim 1, wherein the aroma diffuser is located within an air handling unit that circulates air as part of a heating, ventilating, and air conditioning (HVAC) system of the vehicle.

14. A method for generating aroma-based notifications to one or more occupants of a vehicle by an olfactory communication system, the method comprising:
receiving, by a controller, via a wireless communication with a personal electronic device associated with one of the one or more occupant of the vehicle, a message indicating a specific event is occurring, wherein the specific event is an occurrence that the one or more occupants experience while in an interior cabin of the vehicle, wherein the personal electronic device includes one or more processors and memory that have access to a personal calendar associated with the one of the one or more occupants of the vehicle;
in response to receiving the message, determining an upcoming appointment for the one of the one or more occupants based on the personal calendar, wherein the upcoming appointment is the specific event, determining a customized aroma based on the specific event, wherein the customized aroma creates an odor that informs the one or more occupants of the specific event; and
instructing an aroma diffuser to emit the customized aroma into the interior cabin of the vehicle.

15. A vehicle, comprising:
an olfactory communication system for generating aroma-based notifications to one or more occupants of a vehicle, the olfactory communication system comprising:
an aroma diffuser that emits aromas into an interior cabin of the vehicle; and
one or more controllers are in electronic communication with the aroma diffuser, the one or more controllers are in wireless communication with a personal electronic device associated with one of the one or more occupants of the vehicle, wherein the personal electronic device includes one or more processors and memory that have access to a personal calendar associated with the one of the one or more occupants; the one or more controllers executing instructions to:
receive a message indicating a specific event is occurring, wherein the specific event is an occurrence that the one or more occupants experience while in the interior cabin of the vehicle;
in response to receiving the message, determine an upcoming appointment for the one of the one or more occupants based on the personal calendar, wherein the upcoming appointment is the specific event, determine a customized aroma based on the specific event, wherein the customized aroma creates an odor that informs the one or more occupants of the specific event; and
instruct the aroma diffuser to emit the customized aroma into the interior cabin of the vehicle.

16. The vehicle of claim 15, wherein the specific event is driving through a specific geographic region, and wherein the customized aroma is symbolic of the specific geographical region.

17. The vehicle of claim 15, wherein the specific event is a maintenance procedure that is required for the vehicle.

18. The vehicle of claim 15, wherein the specific event represents weather conditions that surround the vehicle.

19. The vehicle of claim 15, wherein the aroma diffuser includes a plurality of aromatic compounds that are stored separately from one another and mixed together according to a formula to create the customized aroma that is released into the interior cabin of the vehicle.

20. The vehicle of claim 15, wherein the one or more controllers store information regarding personal preferences of the one or more occupants, and wherein the personal preferences indicate certain aromas that the one or more occupants do not tolerate.

* * * * *